United States Patent [19]

Davis

[11] Patent Number: 4,713,738

[45] Date of Patent: Dec. 15, 1987

[54] LIGHT FIXTURE USING A HOLOGRAPHIC OPTICAL REFLECTOR

[76] Inventor: Charles S. Davis, 51 Wooster St., New York, N.Y. 10012

[21] Appl. No.: 897,294

[22] Filed: Aug. 15, 1986

[51] Int. Cl.[4] ............................................. F21V 7/00
[52] U.S. Cl. .................................... 362/296; 350/3.6; 362/347
[58] Field of Search ............... 362/296, 347, 350, 217; 350/3.65, 3.7, 3.72, 3.73, 3.75, 3.77, 3.85

[56] References Cited

U.S. PATENT DOCUMENTS

| | | | |
|---|---|---|---|
| 3,578,838 | 5/1971 | Hallock | 350/3.5 |
| 3,617,702 | 11/1971 | Flournoy | 350/3.73 X |
| 3,619,021 | 11/1971 | Biedermann et al. | 350/3.5 |
| 3,695,744 | 10/1972 | Clay | 350/3.5 |
| 3,708,217 | 1/1973 | McMahon | 350/3.5 |
| 3,807,829 | 4/1974 | Close | 350/3.72 |
| 3,909,111 | 9/1975 | Meyerhofer | 350/117 |
| 3,912,921 | 10/1975 | Howe et al. | 240/9.5 |
| 3,957,353 | 5/1976 | Fienup et al. | 350/3.5 X |
| 3,970,358 | 7/1976 | Kozma | 350/3.5 |
| 4,245,882 | 1/1981 | Chang | 350/3.72 |
| 4,306,763 | 12/1981 | Huignard | 350/3.72 |
| 4,432,044 | 2/1984 | Lautzenheiser | 362/223 |
| 4,458,977 | 7/1984 | Arns et al. | 350/3.65 X |
| 4,500,163 | 2/1985 | Burns et al. | 350/3.7 |

OTHER PUBLICATIONS

P. Hariharan, Optical Holography, 1984, pp. 41–62, 162–193, Cambridge Studies in Principles, Techniques and Applications, Modern Optics.

Herb Brody, Holography Creates New Breed of Optical Components, High Technology, Jul./Aug. 1985, Thin, Lightweight Holograms Mimic Lenses to Infiltrate Optical Systems.

IBM Technical Disclosure, Aug. 1967, Formation of Optical Elements by Holography, G. T. Sincerbox, vol. 10, No. 3.

R. T. Ingwall, H. L. Fielding, Proceedings of SPIE—The International Society for Optical Engineering, Applications of Holography, Jan. 21–23, 1985, Los Angeles, Calif., Polaroid Corporation/vol. 523.

Primary Examiner—Stephen F. Husar
Attorney, Agent, or Firm—Brumbaugh, Graves, Donohue & Raymond

[57] ABSTRACT

Light fixtures achieve improved efficiency by utilizing a reflective holographic optical element to direct light from a light source to a task area. The light fixture can employ any conventional source of artificial incoherent light positioned relative to the reflective holographic optical element such that the reflected light is collimated to provide efficient illumination of the task area.

4 Claims, 2 Drawing Figures

LIGHT FIXTURE USING A HOLOGRAPHIC OPTICAL REFLECTOR

BACKGROUND OF THE INVENTION

The present invention relates to lighting fixtures which employ reflective holographic optical elements to control and direct the radiation pattern of an artificial and incoherent light source. Related inventions are described in my prior U.S. Pat. No. 4,536,833 and in my copending application Ser. Nos. 897,295, 897,292, 897,296.

Known lighting fixtures, whether for interior architecture, road lighting, automobile headlights or theatrical spotlights employ enamelled, polished metal, or vacuum metallized reflectors to direct radiation from a light source in a given photometric pattern. Ray tracing techniques are used to determine the proper contours of the reflector to achieve maximum efficiency in these fixtures, but the overall efficiency is nonetheless limited because ray tracing techniques rely on the erroneous assumption that incandescent filaments are actually point sources. Specifically, any given point on the reflector can provide the correct angle of reflection only for radiation of the correct angle of incidence. Incandescent filaments provide radiation at a variety of angles, however, and radiation reaching the reflector from other than the correct angle is reflected at some different, non-optimum angle leading to a loss of light intensity from the targeted task area.

SUMMARY OF THE INVENTION

It is an object of the present invention to provide lighting fixtures which utilize reflective holographic optical elements to provide efficient direction of available visible radiation to a task area.

Lighting fixtures according to the invention comprise a reflective holographic optical element and a means for fixing a light source in a specific spatial relationship with the reflective holographic optical element. The light source employed can be any conventional source of artifical incoherent light, including incandescent, fluorescent and high intensity discharge light sources. The means for fixing the light source in the lighting fixture is suitably adapted for use with the type of light source employed.

The reflective holographic optical element according to the invention is planar or simply-curved, and is positioned relative to the light source such that radiation from the light source is directed by the reflective holographic optical element to a task area.

DETAILED DESCRIPTION OF THE INVENTION

Holographic optical elements are formed by the interaction of two light beams, a collimated reference beam and an object beam, on a photosensitive recording medium. The interference pattern formed by the interaction of the two beams is fixed in the recording medium to produce the holographic optical element. A collimated beam impinging on this holographic optical element will be diffracted to recreate the object beam. Conversely, light rays striking the holographic optical element at the same angles as the object beam are diffracted to recreate a collimated beam.

Figure 1:
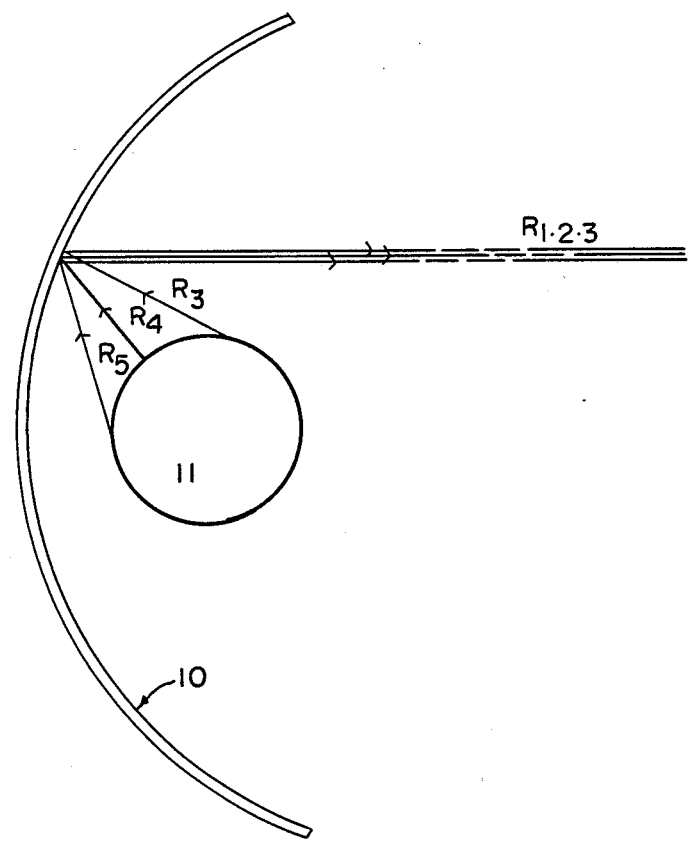
FIG. 1 shows a cross-section of a lighting fixture according to the invention.

Light fixtures according to the invention take advantage of this ability of holographic optical elements to collimate light of various angles of incidence to provide efficient illumination of a task area. As shown in FIG. 1, a reflective holographic optical element 10 is positioned adjacent to a light source 11. Radiation from the light source strikes the surface of the reflective holographic optical element 10 at a variety of angles, as depicted by rays $R_1$, $R_2$ and $R_3$, but because of the nature of reflective holographic optical element 10 is reflected along parallel paths depicted by ray $R_{123}$.

Reflective holographic optical elements for use in light fixtures according to the invention can be made using any known technique, such as those described in P. Hariharan, *Optical Holography*, Cambridge Univ. Press (1984), and in U.S. Pat. Nos. 3,695,744; 3,909,111; 3,957,353; 3,970,358; and 4,245,882 which are incorporated herein by reference. For example, the reflective holographic optical element can be formed as a volume hologram by imaging in a light sensitive dichromate impregnated gelatin, a photosensitive polymerizable monomer such as the vinyl monomers in Polaroid's DMP-128 system, a silver halide photographic emulsion, or other suitable solid light sensitive medium. Alternatively, the holographic elements used can be surface relief holograms formed by imaging onto a film of photoresist followed by chemical etching or by other suitable means. It is advantageous from a production standpoint to be able to duplicate holographic elements using a mold taken from the original, or by some other means that eliminates the need for repetitive imaging.

Figure 2:
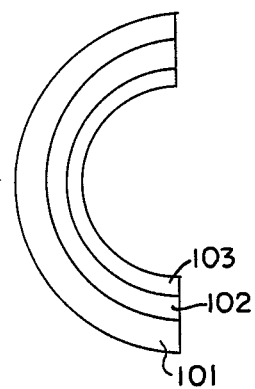
FIG. 2 shows a cross-section of a multilayer holographic optical element.

The reflective holographic optical element may be a multilayer structure as shown in FIG. 2. In this case, various layers 101, 102 and 103 of the holographic element 10 are adapted to diffract a variety of wavelengths of light, and radiation of differing angles of incidence to provide efficient direction of the radiation from the light source. The individual layers can in fact be adapted to a particular light source and light fixture configuration by forming the holographic element using wavelengths of light and incident angles which predominate for a given light source and fixture.

For most applications, the holographic optical elements used are selected to provide substantially achromatic illumination upon reconstruction. That is, if white light is used in reconstructing the image, a substantially white beam of light results. Some colored fringes may be acceptable under these circumstances so long as they do not interfere with the white light illumination of the task area. It is within the scope of this invention, however, to exploit the chromogenic properties of the holographic optical element to produce regions of colored illumination from a white light source. Such chromogenic light fixtures might have applications, for example, in decorative lighting or stage lighting.

The reflective holographic optical element according to the invention is advantageously formed on a flexible support material such as mylar which can be shaped to provide maximum collection and redirection of light from the source to the task area. The shaped reflector can advantageously be U-shaped or dish-shaped, depending on the irradiation from the light source. For example, a U-shaped reflector is appropriate for a fluorescent light tube which does not emit much light parallel to the tube axis, while a dish-shaped reflector is more appropriate for a conventional incandescent bulb. The shapes of these reflectors will generally match mathematical curves, e.g. parabolic or elliptical. The choice of the type and extent of curvature will depend on the application, since the conventional optical properties of the reflector can be used to enhance the effect of the hologram.

The reflector may also be treated such that any light which is outside the range of the holographic elements will be reflected in a conventional manner. Thus, the support material may be metalized or otherwise made reflective prior to deposition of the photosensitive materials thereon. A light ray which passes through the holographic element will be reflected back, either to impinge on another portion of the holographic element to be properly directed to the task area or out of the reflector and generally toward the task area. In either case, the efficiency is enhanced over a holographic reflector having a transparent or absorptive support.

I claim:

1. An architectural lighting fixture comprising a reflective holographic optical element and means for fixing an incoherent light source in a spatial relationship to the reflective holographic optical element such that radiation from the light source impinges on the reflective holographic optical element and is directed by the reflective holographic optical element to a task area.

2. A light fixture according to claim 1, wherein the reflective holographic optical element is formed from a plurality of layers, each layer acting to reflect a portion of the incident radiation such that essentially all of the radiation from the light source is redirected to a task area.

3. A light fixture according to claim 1, wherein the reflective holographic optical element is a volume hologram.

4. A lighting fixture according to claim 2, wherein the light source is a source of white light, and the fixture provides substantially achromatic illumination to the task area.

* * * * *